(12) United States Patent
Matthews

(10) Patent No.: US 6,678,308 B1
(45) Date of Patent: Jan. 13, 2004

(54) LASER RESONATOR SYSTEM USING OFFNER RELAY

(75) Inventor: Edward W. Matthews, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/236,770

(22) Filed: Sep. 6, 2002

(51) Int. Cl.[7] .................................................. H01S 3/08
(52) U.S. Cl. ........................................... 372/98; 372/95
(58) Field of Search ............................... 372/98, 69–75, 372/95, 99

(56) References Cited

U.S. PATENT DOCUMENTS

| | | | |
|---|---|---|---|
| 3,748,015 A | | 7/1973 | Offner |
| 3,969,687 A | * | 7/1976 | Freiberg et al. ................ 372/95 |
| 4,164,366 A | * | 8/1979 | Sziklas et al. ................. 372/95 |
| 4,170,405 A | * | 10/1979 | Sziklas ........................... 372/95 |
| 5,025,446 A | | 6/1991 | Kuizenga |
| 5,659,563 A | * | 8/1997 | Reed et al. ................... 372/101 |
| 6,545,758 B1 | * | 4/2003 | Sandstrom .................... 356/317 |

OTHER PUBLICATIONS

Tetsuo Kojima, et al., *Stabilization of a High–Power Diode––Side–Pumped Intracavity–Frequency–Doubled CW Nd: YAG Laser by Compensating for Thermal Lensing of a KTP Crystal and Nd: YAG Rods*, IEEE Journal of Quantum Electronics, Mar. 1999, vol. 35, No. 3, pp. 377–380.

R.J. Beach, et al., *High–Average–Power Diode–Pumped Yb: YAG Lasers*, Society of Photo–Optical Instrumentation Engineers, Nov. 1999, Pre–Publication Version , pp. 1–15.

M.V. Ortiz, et al., *High–Average–Power Second Harmonic Generation with KTiOPO$_4$*, OSA Proceedings on Advanced Solid–State Lasers, 1992, vol. 13, pp. 361–366.

X.G. Huang, et al., *Effects of Thermal Lensing on Stability and Astigmatic Compensation of a Z–Fold Laser Cavity*, J. Opt. Soc. Am. B, Dec. 1996, vol. 13, No. 12, pp. 2863–2868.

* cited by examiner

Primary Examiner—Quyen Leung
Assistant Examiner—Hung T Vy
(74) Attorney, Agent, or Firm—Ingrassia Fisher & Lorenz, P.C.

(57) ABSTRACT

The laser resonator system includes a first reflector; a second reflector; at least a first gain medium; a second gain medium; and, an Offner relay system. The first gain medium and the second gain medium are operatively positioned relative to the first and the second reflectors. The first and second gain media generate a laser beam. The Offner relay system is operatively positioned between the first and the second gain media for relaying the laser beam between the first and the second gain media. The laser resonator system uses the Offner relay system for optimal transmission of the laser beam between the two gain media.

26 Claims, 1 Drawing Sheet

LASER RESONATOR SYSTEM USING OFFNER RELAY

BACKGROUND OF THE INVENTION

1. Field of the Invention

The present invention relates to laser resonators and more particularly to the generation of high power, high beam quality laser beams.

2. Description of the Related Art

The impact that semiconductor lasers have had on the development of solid-state lasers is evident in high-average-power solid-state laser systems, which are finding increasingly wide application in the field of material processing. High-average-power diode-pumped solid-state lasers (HAP DPSSLs.) are best characterized as being performance limited by thermal management issues associated with the solid state laser crystal. These thermal management issues can manifest themselves in several different forms. Examples include aberration of beam quality due to thermally induced refractive index variations in the crystal, and in extreme cases, fracture of the laser crystal due to the buildup of excessive stress in the crystal. The most commonly used ion/host crystal combination is $Nd^{3+}$:YAG. Of all the well-developed laser crystals that can be grown with rare-earth impurities, YAG is the most robust in the thermal sense; i.e., it has the highest thermal conductivity and the highest resistance to fracture. For these reasons, YAG is the crystalline host of choice for HAP DPSSLs.

Recent developments in laser diode array technologies have resulted in Lawrence Livermore National Laboratory (LLNL) pursuing a diode array pump technology that enables pump power to be delivered at much higher irradiances than was previously possible. Many rare-earth ion based HAP DPSSLs are only practical if pumped at higher irradiances than the several $kW/cm^2$ that is possible with conventional scaled diode array technologies. Thus, this direction has opened a path to HAP DPSSLs that rely on ions other than $Nd^{3+}$ as their lasant. LLNL has demonstrated a HAP Yb:YAG DPSSL which generates a very high average brightness. This LLNL design uses a dual rod configuration consisting of two, 5 cm long by 2 mm diameter laser rods with birefringence compensation, and has achieved 1080 W of cw output with an $M^2$ value of 13.5 at an optical-to-optical conversion efficiency of 27.5%.

The approach that LLNL has followed to achieve good beam quality at high-average power relies on designing the laser resonators to run with large diameter fundamental modes in the presence of strong thermal lensing. The laser rod itself acts as a spatial filter, limiting the number of transverse modes beyond the fundamental, which are supported by the cavity without incurring large diffractive losses. However, in single rod lasers, stress-induced birefringence and bifocussing place a limit on the $TEM_{00}$ mode size that can be produced. As a result the stability zones for the radially polarized light and the tangentially polarized light can pull apart at high thermal loading due to the difference between the stress in the radial and tangential directions in the rod. This leaves little possibility for stable mode operation of the laser cavity. One technique, which was originally demonstrated in 1970 can, to a great extent, eliminate birefringence and bifocussing effects by using two identically loaded rods separated by a 90° rotator. There have been several recent reports of groups using this birefringence compensation technique successfully with diode-pumped Nd:YAG lasers. LLNL has used the same approach to compensate for birefringence and bifocussing in their Yb:YAG laser.

For pump powers greater than 3 kW LLNL inserted a negative lens between the two laser rods to maintain resonator stability. This lens was housed in the same fixture used to hold the 90° rotator. The lens was varied as a function of the applied pump power and chosen so as to maintain a near constant $TEM_{00}$ beam waist in the presence of the strong thermal lens in the laser rods. The $TEM_{00}$ beam waist is held constant by the choice of a compensating negative lens. Therefore, it would be expected that the external beam quality of the developed laser radiation would also be nearly constant.

This technology has since undergone further development at The Boeing Company. Repeated laboratory experience in setting up, aligning and operating the laser has shown that the thermal effects represent a significant hurdle to further development. In particular, thermal damage has occurred in both the lens and the rotator, requiring replacement of these components or laser operation at power levels low enough to minimize damage.

U.S. Pat. No. 3,748,015, issued to A. Offner, discloses an optical device that is now known as an "Offner relay". Such a device has been typically used, heretofore, in photolithography. The Offner relay was originally used as a mask aligner for projecting a telecentric image of a mask onto a semiconductor wafer. It is well known within the photolithography field, as is its ability to create high-quality images. The Offner relay consists of two concentric spherical mirrors, a primary mirror whose surface is concave and a secondary mirror whose surface is convex. The primary mirror reflects the image to the secondary mirror, which in turn reflects the image back to the primary mirror.

SUMMARY

In a broad aspect, the laser resonator system of the present invention includes a first reflector; a second reflector; at least a first gain medium; a second gain medium; and, an Offner relay system. The first gain medium and the second gain medium are operatively positioned relative to the first and the second reflectors. The first and second gain media generate a laser beam. The Offner relay system is operatively positioned between the first and the second gain media for relaying the laser beam between the first and the second gain media.

Utiilization of an Offner relay system inside a laser cavity minimizes or obviates the need for refractive elements in this resonator. This accomplishes several things:

Light is reflected away from the Offner relay system to form an image of the object that is free of all first-order aberrations; i.e., there is no spherical aberration, coma, astigmatism, field curvature, or distortion. Although some aberrations are introduced when the light first reflects off a primary mirror of the Offner relay system, these are exactly cancelled by aberrations introduced by a second reflection off the primary mirror, so that the Offner relay system, itself, introduces no first-order aberrations to the image. Since the relay has no refractive components, there is the additional benefit that no chromatic aberration is added to the image. The result is excellent image quality across the entire field.

It reduces the distortions in the beam caused by heat-induced substrate deformation.

It is easier to cool mirrors than lenses, so the possibility of greater laser power is created.

The Offner relay system introduces a minimum of new aberrations, so the focus it produces is superior than that of a lens.

The above factors result in a very stable, high quality, and high power output beam.

Other objects, advantages, and novel features will become apparent from the following detailed description of the invention when considered in conjunction with the accompanying drawings.

BRIEF DESCRIPTION OF THE DRAWINGS

The same parts or elements throughout the drawings are designated by the same reference characters.

DETAILED DESCRIPTION OF THE INVENTION

Figure 1:
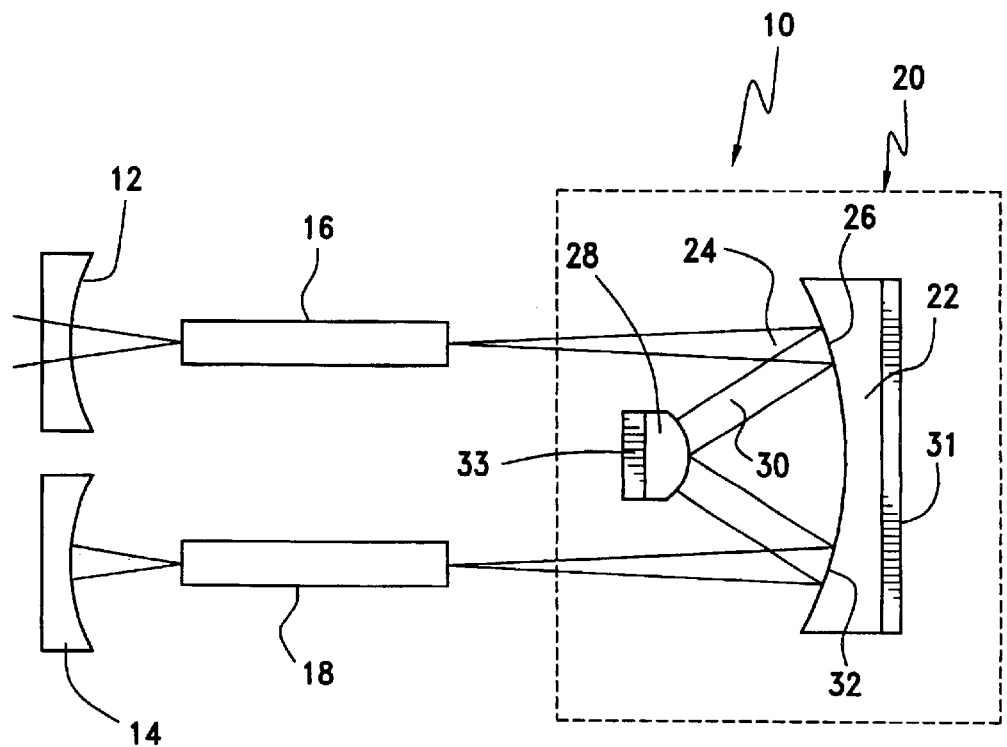
FIG. 1 is a schematic illustration of a first embodiment of the laser resonator system, illustrating the use of adjacent reflectors.

Referring now to the drawings and the characters of reference marked thereon, FIG. 1 illustrates a first preferred embodiment of the present invention, designated generally as 10. The laser resonator system 10 includes a first reflector 12 and a second reflector 14. The first reflector 12 may comprise, for example, an output coupler and the second reflector 14 a high reflector. The output coupler may be, for example, formed of fused silica or other suitable optical materials generally used in this field. The high reflector 14 may be made of, for example, fused silica with a refective coating or, for example, polished silver.

A first gain medium 16 and a second gain medium 18 are operatively positioned relative to the first and said second reflectors 12, 14. The first and second gain media generate a laser beam, which may operate in the visible, ultraviolet or infrared spectrum. The gain medium may be, for example, solid state, such as a Nd:YAG crystal. It may be, for example, diode-pumped. Obviously, other suitable gain media may be used such as gaseous, chemical or plasma.

An Offner relay system, designated generally as 20, is operatively positioned between the first and the second gain media 12, 14 for relaying a laser beam between the first and the second gain media 16, 18, as will be explained below. The Offner relay system 20 provides a substantially distortion-free unit magnification all-reflecting optical system with accessible object and image planes. Offner relay systems are known in the prior art of photolithography and imaging. A seminal patent describing such a system is disclosed and claimed in U.S. Pat. No. 3,748,015, incorporated herein, in its entirety, by reference. An Offner relay system incorporates convex (secondary) and concave (primary) spherical mirrors arranged with their centers of curvature coinciding at a single point. The mirrors are arranged with their axial conjugate areas at the latter point and are arranged to provide two off axis conjugate areas at unit magnification in a plane which contains this point, the reference axis of this system being an axis normal to the latter plane and through the point. This provides a system which is free from spherical aberration, coma and distortion and provides diffraction limited performance for systems of the subject type having moderate apertures and fields.

In this first embodiment, the first reflector 12 is positioned adjacent the second reflector 14 and the first gain medium 16 and the second gain medium 18 are positioned in parallel.

A primary mirror 22 of the Offner relay system 20 has positive power for reflecting a first diverging output beam 24 provided by the first gain medium 16. The reflected first diverging output beam 24 is reflected from a first location 26 on the primary mirror 22. The primary mirror 22 may be, for example, polished silver or other suitable reflecting material.

A secondary mirror 28 of the Offner relay system 20 has negative power for reflecting the reflected first diverging output beam 30 from the first location 26 on the primary mirror 22 to a second location 32 on the primary mirror 22. It is then reflected toward the second gain medium 18. The second gain medium 18 provides a second diverging output beam having a coincident path with the first diverging output beam 24 but having a reverse direction.

The system 10 may include a cooling system 31,33 for cooling the primary mirror 22 and the secondary mirror 28, respectively. Such a cooling system may comprise an active cooling system such as heat exchangers or a passive system such as is well known in this field.

Figure 2:
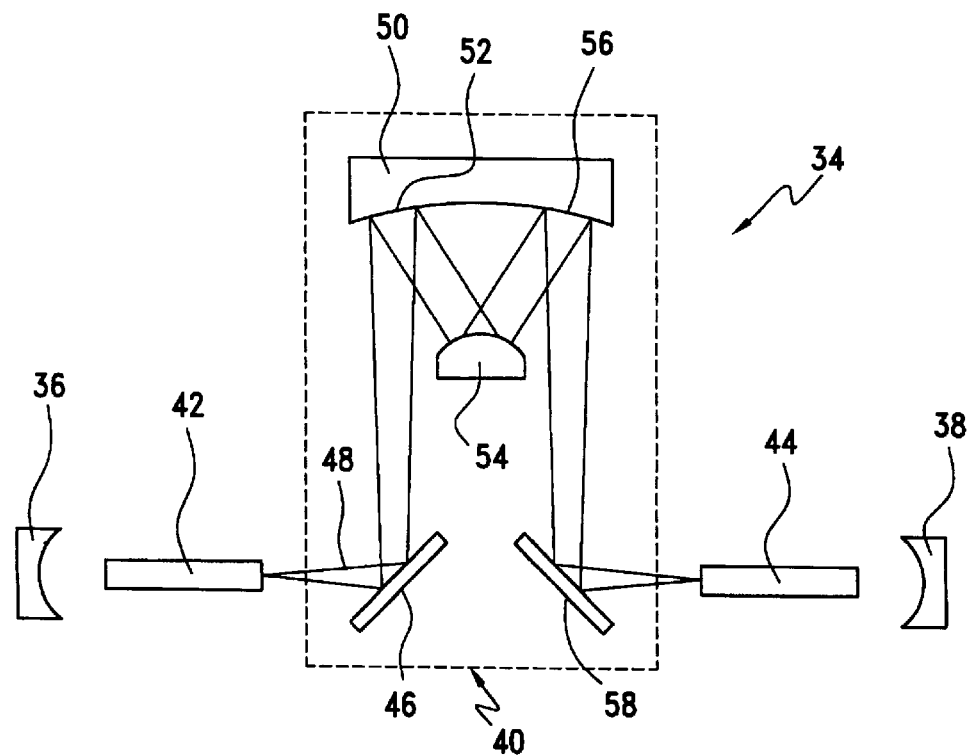
FIG. 2 is a schematic illustration of a second embodiment of the laser resonator system, illustrating the use of reflectors on opposite sides of the Offner relay.

Referring now to FIG. 2, a second embodiment is illustrated, designated generally as 34. In laser resonator system 34 a first reflector 36 is positioned opposite a second reflector 38 relative to the Offner relay system 40. A first gain medium 42 and a second gain medium 44 are collinearly positioned.

A first turning mirror 46 turns a first diverging output beam 48. A primary mirror 50 having positive power reflects the turned first diverging output beam 48 from the first turning mirror 46. The first diverging output beam 48 is reflected from a first location 52 on the primary mirror 50.

A secondary mirror 54 having negative power reflects the reflected first diverging output beam 48 from the first location 52 on the primary mirror 50 to a second location 56 on the primary mirror 50. A second turning mirror 58 turns the reflected first diverging output beam 48 from the second location 56 to the second gain medium 44. The second gain medium 44 provides a second diverging output beam having a coincident path with the first diverging output beam 48 but having a reverse direction.

This second embodiment 34 has the capacity for controlling the polarization angle of the laser beam between the two gain media 42,44. This may be accomplished by rotating the plane of the Offner relay system 40 about the gain medium axis defined by the collinear positioning of the gain media 42,44. Such a rotation of the polarization angle is equivalent to image rotation. It is well known in this field that a system of five turning mirrors provides the capacity to rotate the orientation of an image. In this second embodiment, the Offner relay system 40 replaces two of the turning mirrors with the primary mirror 50 and another turning mirror with the secondary mirror 54. The Offner relay system 40 thereby changes the polarization angle of the laser beam between the two gain media 42,44 as a function of the angle of the plane of the Offner relay system 40.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A laser resonator system comprising:
   a) a first reflector comprising an output coupler;
   b) a second reflector comprising a high reflector;
   c) at least a first gain medium and a second gain medium operatively positioned relative to said first and said second reflectors, said first and second gain media for generating a laser beam; and,
   d) an Offner relay system operatively positioned between said first and said second gain media for relaying said laser beam between said first an said second gain media.

2. The laser resonator system of claim 1, wherein said first reflector is positioned adjacent said second reflector and said first gain medium and said second gain medium are positioned in parallel.

3. The laser resonator system of claim 1, wherein said first reflector is positioned adjacent said second reflector and said first gain medium and said second gain medium are positioned in parallel, said first gain medium providing a first diverging output beam, said Offner relay system, comprising:
   a) a primary mirror having positive power for reflecting said first diverging output beam, the reflected first diverging output beam being reflected from a first location on said primary mirror; and,
   b) a secondary mirror having negative power for reflecting the reflected first diverging output beam from said first location on said primary mirror to a second location on said primary mirror, said first diverging output beam then being reflected from said second location on said primary mirror toward said second gain medium,
wherein said second gain medium provides a second diverging output beam having a coincident path with said first diverging output beam but having a reverse direction.

4. The laser resonator system of claim 1, wherein said first reflector is positioned opposite said second reflector relative to said Offner relay system and said first gain medium and said second gain medium are collinearly positioned.

5. The laser resonator system of claim 1, wherein said first reflector is positioned opposite said second reflector relative to said Offner relay system and said first gain medium and said second gain medium are collinearly positioned, said first gain medium providing a first diverging output beam, said Offner relay system, comprising:
   a) a first turning mirror for turning said first diverging output beam;
   b) a primary mirror having positive power for reflecting the turned first diverging output beam from said first turning mirror, the first diverging output beam being reflected from a first location on said primary mirror;
   c) a secondary mirror having negative power for reflecting the reflected first diverging output beam from said first location on said primary mirror to a second location on said primary mirror; and,
   d) a second turning mirror for turning the reflected first diverging output beam from said second location to said second gain medium,
wherein said second gain medium provides a second diverging output beam having a coincident path with said first diverging output beam but having a reverse direction.

6. The laser resonator system of claim 1, wherein said first reflector is positioned opposite said second reflector relative to said Offner relay system and said first gain medium and said second gain medium are collinearly positioned along an gain medium axis, said Offner relay system being rotatable about said gain medium axis.

7. The laser resonator system of claim 1, wherein said first reflector comprises an output coupler and said second reflector comprises a high reflector.

8. The laser resonator system of claim 1, wherein said first gain medium comprises a solid state gain medium.

9. The laser resonator system of claim 1, wherein said first gain medium comprises a gaseous gain medium.

10. The laser resonator system of claim 1, wherein said first gain medium comprises a chemical gain medium.

11. The laser resonator system of claim 1, wherein said first gain medium comprises a plasma gain medium.

12. The laser resonator system of claim 1, wherein said first gain medium comprises a diode-pumped solid state gain medium.

13. The laser resonator system of claim 1, wherein said generated laser beam comprises a high-power laser beam.

14. The laser resonator system of claim 1, wherein said generated laser beam comprises a high-power laser beam in a range of between about 500 watts to about 1,500 watts.

15. The laser resonator system of claim 1, wherein said generated laser beam comprises a high-power laser beam of about 1 kilowatt.

16. The laser resonator system of claim 1, wherein said Offner relay system comprises a cooling system for cooling.

17. The laser resonator system of claim 1, wherein said generated laser beam operates in the infrared spectrum.

18. The laser resonator system of claim 1, wherein said generated laser beam operates in the visible spectrum.

19. The laser resonator system of claim 1, wherein said generated laser beam operates in the ultraviolet spectrum.

20. The laser resonator system of claim 1, wherein said Offner relay system comprises a primary mirror system including two primary mirrors.

21. A laser resonator system, comprising:
   a) a first reflector comprising an output coupler;
   b) a second reflector comprising a high reflector;
   c) at least a first gain medium and a second gain medium operatively positioned relative to said first and said second reflectors, said first and second gain media for generating a laser beam, said first reflector being positioned adjacent said second reflector and said first gain medium and said second gain medium being positioned in parallel, said first gain medium comprising a diode-pumped solid state gain medium and providing a first diverging output beam; and,
   d) an Offner relay system operatively positioned between said first and said second gain media for relaying said laser beam between said first and said second gain media, said Offner relay system, comprising:
      i) a primary mirror having positive power for reflecting said first diverging output beam, the reflected first diverging output beam being reflected from a first location on said primary minor; and,
      ii) a secondary mirror having negative power for reflecting the reflected first diverging output beam from said first location on said primary mirror to a second location on said primary mirror, said first diverging output beam then being reflected from said second laocation on said primary mirror toward said second gain medium,
wherein said second gain medium provides a second diverging output beam having a coincident path with said first diverging output beam but having a reverse direction.

22. A resonator system for generating a laser beam in a laser system, the resonator system comprising:
   a first reflector having an output coupler configured to provide the laser beam to the laser system;
   a second reflector;
   at least a first gain medium and a second gain medium optically positioned between to the first and the second reflectors, respectively, wherein the first and second gain media are configured to generate the laser beam; and,
   an Offner relay system optically positioned between the first and second gain media, wherein the Offner relay system is configured to relay the laser beam between the first and second gain media to thereby complete an optical path between the first and second reflectors.

23. The resonator system of claim 22 wherein the Offner relay system comprises a primary mirror and a secondary mirror.

24. The resonator system of claim 22 wherein the Offner relay system comprises a cooling system coupled to the primary and secondary mirrors.

25. The resonator system of claim 24 wherein the cooling system comprises an active cooling system.

26. The resonator system of claim 24 wherein the cooling system comprises a passive cooling system.

* * * * *

UNITED STATES PATENT AND TRADEMARK OFFICE
CERTIFICATE OF CORRECTION

PATENT NO. : 6,678,308 B1
DATED : January 13, 2004
INVENTOR(S) : Edward W. Matthews It is certified that error appears in the above-identified patent and that said Letters Patent is hereby corrected as shown below:

Column 4,
Line 66, delete "an" and add -- and --

Column 5,
Line 54, delete "an" and add -- a --

Column 6,
Line 48, delete "laocation" and add -- location --
Line 59, delete "to"

Signed and Sealed this

Twenty-fifth Day of May, 2004

JON W. DUDAS
*Acting Director of the United States Patent and Trademark Office*